United States Patent
Connolly et al.

(10) Patent No.: US 9,892,351 B2
(45) Date of Patent: Feb. 13, 2018

(54) BLUETOOTH LOW ENERGY I(BLE)-BASED ASSET TAG WITH INTEGRATED SCANNER FOR, AND METHOD OF, TRANSMITTING AN ASSET-IDENTIFYING CODE AS A BEACON TRANSMISSION

(71) Applicant: SYMBOL TECHNOLOGIES, INC., Lincolnshire, IL (US)

(72) Inventors: Sean A Connolly, Stonybrook, NY (US); James R Giebel, Centerport, NY (US); Umberto R Scaramozzino, Port Jefferson, NY (US)

(73) Assignee: Symbol Technologies, LLC, Holtsville, NY (US)

(*) Notice: Subject to any disclaimer, the term of this patent is extended or adjusted under 35 U.S.C. 154(b) by 95 days.

(21) Appl. No.: 14/538,247

(22) Filed: Nov. 11, 2014

(65) Prior Publication Data
US 2016/0132758 A1    May 12, 2016

(51) Int. Cl.
G06K 17/00    (2006.01)
H04W 4/00    (2009.01)
G06K 7/10    (2006.01)

(52) U.S. Cl.
CPC ..... G06K 17/0022 (2013.01); G06K 7/10821 (2013.01); H04W 4/008 (2013.01)

(58) Field of Classification Search
CPC ...... G01S 11/02; G01S 13/767; G01S 5/0289; G01S 5/0294; G01S 5/12; G06K 17/0022; G06K 7/10821; H04W 4/008
See application file for complete search history.

(56) References Cited

U.S. PATENT DOCUMENTS

| | | | |
|---|---|---|---|
| 7,525,453 B2 | 4/2009 | Henty | |
| 2002/0161658 A1 | 10/2002 | Sussman | |
| 2014/0055243 A1* | 2/2014 | Kerai | G06Q 10/0833 340/10.1 |
| 2014/0154987 A1* | 6/2014 | Lee | H04M 1/7253 455/41.2 |
| 2014/0209687 A1* | 7/2014 | Cancro | G06Q 30/02 235/472.01 |
| 2014/0295814 A1* | 10/2014 | Heo | H04W 4/005 455/418 |
| 2015/0097028 A1* | 4/2015 | Bakker | G06Q 20/351 235/379 |
| 2015/0097653 A1* | 4/2015 | Gibbs | G06K 7/10366 340/10.1 |

* cited by examiner

*Primary Examiner* — Sonji Johnson
(74) *Attorney, Agent, or Firm* — Yuri Astvatsaturov

(57) ABSTRACT

A Bluetooth low energy (BLE)-based asset tag transmits a code that identifies an asset. A device is attached to the asset. The code is scanned with a scanner supported by the device. An advertising beacon is transmitted in an advertising packet having a payload with a Bluetooth low energy (BLE)-based radio supported by the device. The scanned code is automatically loaded into the payload. The advertising packet with the scanned code in the payload is periodically transmitted as a series of beacon pulses.

18 Claims, 4 Drawing Sheets

BLUETOOTH LOW ENERGY I(BLE)-BASED ASSET TAG WITH INTEGRATED SCANNER FOR, AND METHOD OF, TRANSMITTING AN ASSET-IDENTIFYING CODE AS A BEACON TRANSMISSION

BACKGROUND OF THE INVENTION

The present disclosure relates generally to an asset tag in which Bluetooth low energy (BLE)-based technology has been incorporated and, more particularly, to a BLE-based asset tag for, and a method of, transmitting an asset-identifying code as a beacon transmission and, still more particularly, to integrating a scanner with the tag for scanning and loading/writing a barcode that identifies an asset into a payload of an advertising packet transmitted by the beacon transmission for inventory tracking and locating the asset.

Radio frequency (RF) identification (RFID) technology has long been used to track and locate assets for logistics concerns, material handling and inventory management in retail stores, warehouses, distribution centers, buildings, and like controlled areas. An RFID system typically includes an RFID reader or interrogator for interrogating RFID tags with interrogating RF signals. Each RFID tag is usually attached to, or associated with, an asset, such as an individual item, or a package for holding the item, or a pallet or container for supporting or containing multiple items. Each RFID tag senses an interrogating RF signal, and responds with a return RF signal that contains information stored internally in the RFID tag. The return RF signal is decoded into data by the system, which thereby identifies, counts, or otherwise interacts with the associated asset. The decoded data, also known as a payload, can denote a serial number, a price, a date, a destination, other attribute(s), or any combination of attributes, and so on.

Yet, as advantageous as the known RFID systems have been in monitoring inventory, the known RFID tags have exhibited a relatively poor sensitivity, a relatively small detection range, and a relatively brief working lifetime in practice. Real-world conditions, such as metallic shelving, fixtures, equipment, vehicles, and the like, may sometimes interfere with, and reflect and/or absorb, the interrogating and the return RF signals. As a result, the known RFID systems cannot always accurately find and locate each RFID tag, especially at long range, and after long periods of field deployment. Such relatively poor performance is aggravated when the RFID tags are attached to assets that include metallic surfaces and liquids.

In addition, a relatively high power RFID reader is needed in order to write or program the information into the RFID tag, and to de-commission the RFID tag. This reader is typically located at a tag printing machine or a dedicated tag writing station. Such machines or stations may not always be available, especially if an asset to be tagged is located at a site that is not normally used for tagging. Hence, RFID tags are not so readily re-deployed and/or de-commissioned.

Accordingly, there is a need to use a technology other than RFID technology to tag assets, to improve the operating performance and range at which tags can be read, to lengthen the working lifetime of the tags, to tag assets at any location, to de-commission/re-deploy tags at any location, and to more accurately and reliably track and locate tagged assets.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
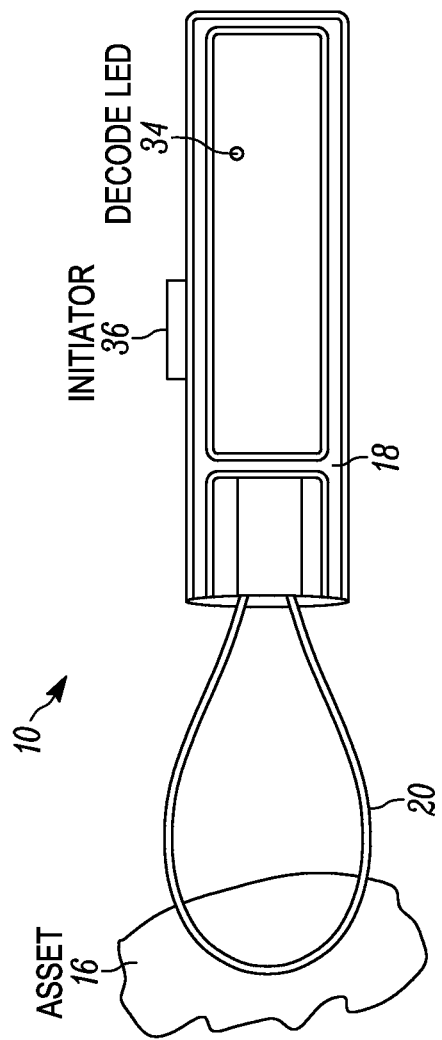
FIG. 1 is a plan view of a BLE-based asset tag with an integrated/embedded scanner in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The tag and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to an asset tag in which Bluetooth low energy (BLE)-based technology has been incorporated. The BLE-based asset tag transmits at least one code, e.g., a Universal Product Code (UPC) symbol, an Electronic Product Code (EPC) symbol, or a like code standard, that identifies an asset or item. Preferably, a multitude of tags are employed for transmitting a corresponding multitude of codes for a corresponding multitude of assets or items located in a controlled area. The controlled area may be a retail store, a warehouse, or any other confined or open area in which asset-tagged items are to be monitored or located. Each asset may be any individual item, e.g., clothing, or any package for holding any item, or any pallet or container for supporting or containing multiple items. Each tag includes a device for attachment to each asset; a scanner supported by the device, and operative for scanning the code; a BLE radio supported by the device, and operative for transmitting an advertising beacon in an advertising packet having a payload; and a controller supported by the device, and operative for automatically loading the scanned code into the payload.

In a preferred embodiment, the scanner electro-optically reads the code, and includes a light source, e.g., a laser diode or a light emitting diode, for directing a light beam to the code for return as reflected and/or scattered light therefrom, and a light detector, e.g., a photodiode, for detecting the reflected and/or scattered return light from the code. The controller is preferably a programmed microprocessor that processes the detected return light into an electrical signal, decodes the electrical signal into decoded data indicative of the scanned code, and writes the decoded data into the payload. The BLE radio transmits the advertising packet with the scanned code in the payload as a series of beacon pulses.

Advantageously, the device has a light-transmissive window through which the light beam and the return light pass, and the window is in contact with the code during scanning. A manually operated control, such as a button, or an automatically operated near field communication (NFC) control, is employed for initiating the scanning. An indicator, such as a light emitting diode, is preferably employed for indicating that the scanning was successful.

A method, in accordance with another aspect of the present disclosure, of transmitting a code that identifies an asset, is performed by attaching a device to the asset, scanning the code with a scanner supported by the device, transmitting an advertising beacon in an advertising packet having a payload with a Bluetooth low energy (BLE)-based radio supported by the device, and automatically loading the scanned code into the payload.

Figure 2:
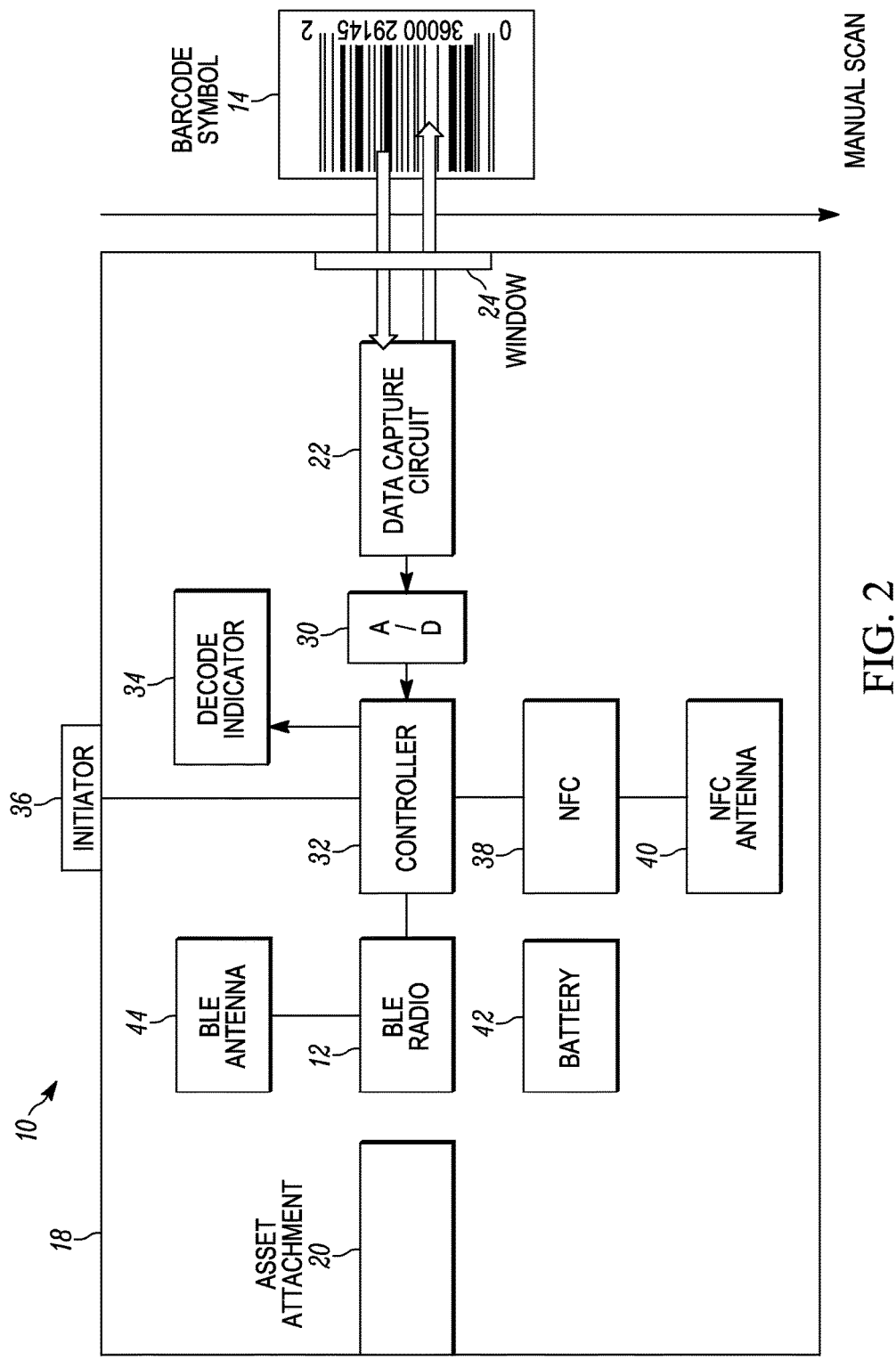
FIG. 2 is a block diagram of the asset tag of FIG. 1.

Turning now to the drawings, reference numeral 10 in FIGS. 1-2 depicts an asset tag in which a Bluetooth low energy (BLE)-based radio 12 has been incorporated in accordance with the present disclosure. BLE is an industry standard, wireless personal area network technology and protocol designed and marketed by the Bluetooth Special Interest Group with the adoption of the Bluetooth Core Specification Version 4.0. This protocol is used for short range wireless communication between devices in networks and operates in the 2.4 GHz ISM band with 40 channels spaced 2 MHz apart. Three of the channels are advertising channels to allow for device discovery, and the remaining channels are used to transmit data. This protocol is characterized by its low electrical power consumption requirement, in which a BLE device can operate for years on a single coin battery or button cell, as well as by its small size and low cost. These features are advantageous in the context of its incorporation and use in the asset tag 10, as detailed below. For further details of the operating performance and energy efficiency of this protocol, reference can be had to https://www.bluetooth.org/Technical/Specifications/adopted.htm, the entire contents of which are incorporated herein by reference thereto.

The BLE tag 10 is operative for transmitting at least one code 14 (see FIG. 2), e.g., a Universal Product Code (UPC) symbol, or an Electronic Product Code (EPC) symbol, or a like code standard or target, that identifies an asset 16 or an item, and preferably a multitude of tags are employed to identify a corresponding multitude of assets or items located in a controlled area. The controlled area may be a retail store, a warehouse, or any other confined or open area in which asset-tagged items are to be monitored or located. The asset 16 may be any individual item, e.g., clothing, handbags, cameras, etc., or any package for holding any item, or any pallet or container for supporting or containing multiple items. The tag 10 includes a housing or a device 18 for attachment to the asset 16. Although FIG. 1 depicts the attachment as a looped tether 20, it will be understood that many other types of attachment could have been employed, including the various mechanical and magnetic types of attachment commonly used to secure Electronic Article Surveillance (EAS) security tags on articles to be secured from theft. Although FIG. 1 depicts a single code 14, it will be understood that more than one code can be used to identify the asset 16.

Figure 3:
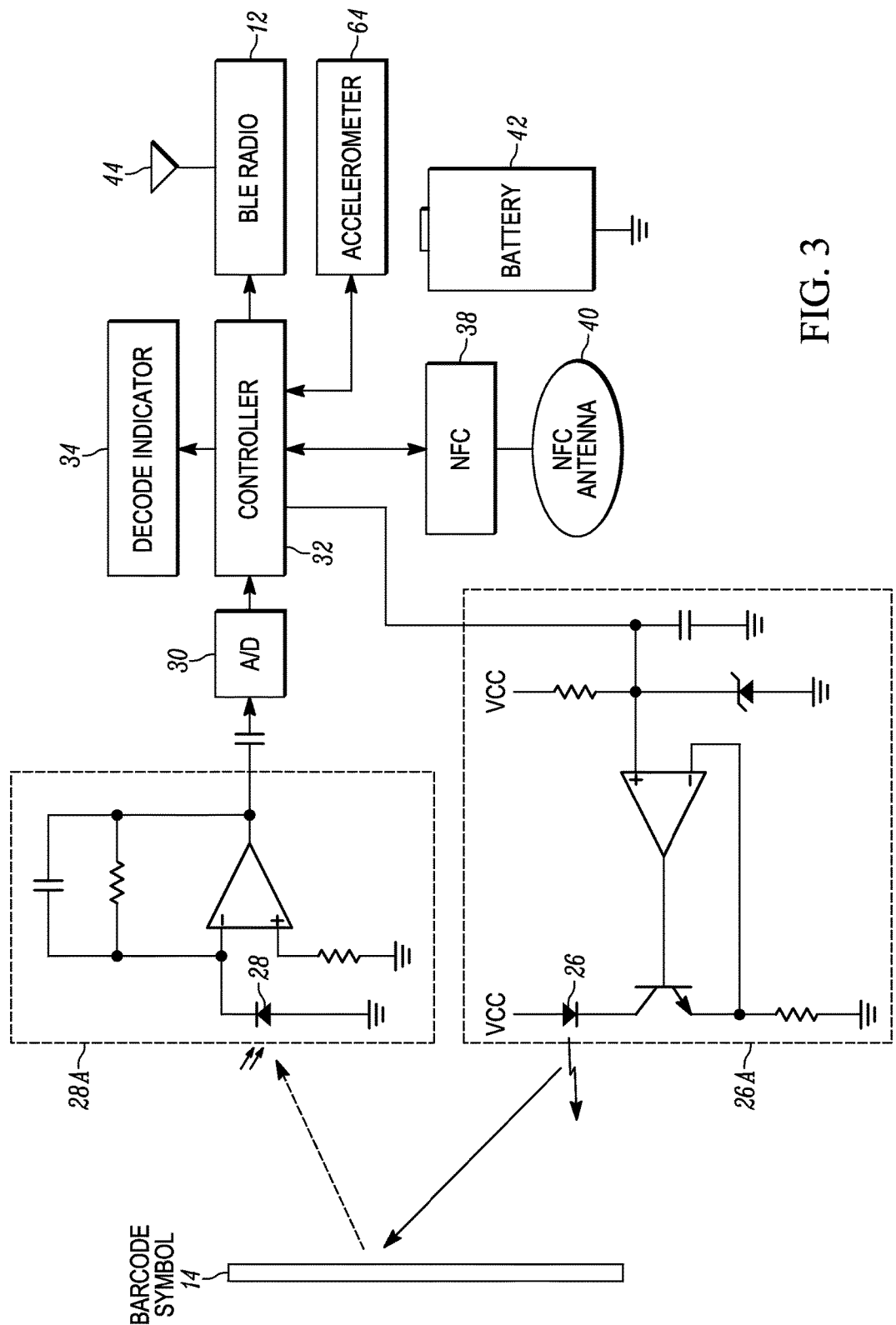
FIG. 3 is an electric schematic of some of the blocks of the asset tag of FIG. 1.

The BLE tag 10 includes a data capture circuit 22 supported by the device 18, and comprised of a drive circuit 26A and a receive circuit 28A (see FIG. 3). The device 18 has a light-transmissive window 24. In a preferred embodiment, as shown in FIG. 3, the drive circuit 26A includes a light source 26, e.g., a laser diode or a light emitting diode, for directing a light beam through the window 24 to the code 14 for return as reflected and/or scattered light therefrom; and the receive circuit 28A includes a light detector 28, e.g., a photodiode, for detecting the reflected and/or scattered return light from the code 14 through the window 24. The receive circuit 28A outputs an analog electrical signal indicative of the detected return light. The analog signal is then processed by an analog-to-digital (A/D) converter 30, and the converted digital electrical signal is then processed by a controller 32. The controller 32 is preferably a programmed microprocessor that decodes the digital signal into decoded data indicative of the code 14.

The drive circuit 26A, the receive circuit 28A, the converter 30, and the controller 32 together comprise a scanner operative for scanning the code 14, which, in FIG. 2, is depicted as a one-dimensional UPC barcode symbol. Two-dimensional symbols, or a plurality of barcode symbols, could also be employed. The scanner need not comprise the illustrated components, but can be any circuit for electro-optically reading the code 14.

As illustrated in FIG. 2, the scanner 26A, 28A, 30, 32 is a manual scanner, i.e., the window 24 is placed adjacent the code 14, and preferably in contact therewith, and the device 18 is manually dragged by a user and slid across the code 14. In that event, it is advantageous if the device 18 is elongated, like a pen or a wand, so that the user can conveniently hold the device 18 in the user's hand, and slide the window 24 across the code 14. Of course, other shapes are contemplated for the device 18. In another embodiment, the light beam or the return light can be automatically and repetitively swept across the code 14 by a reciprocally-oscillating, motor-driven mirror. In still another embodiment, a solid-state imaging sensor, such as a charge coupled device (CCD) or a complementary metal oxide semiconductor (CMOS) device of the kind commonly used in digital cameras could be employed to take an image of the code 14. The manual scanner is currently preferred as the most inexpensive of all these alternative scanners.

An indicator 34, such as a light emitting diode, is preferably employed for indicating that the scanning was successful. Other indicators, such s an auditory beeper, could also be used. A manually operated control, such as a pushbutton 36, or an automatically operated near field communication (NFC) control that is comprised of an NFC circuit 38 and an NFC antenna 40, is employed for initiating the scanning. A battery 42, preferably a single coin battery or a button cell, is mounted on the device 18 to power all the electrical circuitry thereon.

The aforementioned BLE radio 12 is supported by the device 18, is connected to the controller 32, and includes a BLE antenna 44. As described below in detail in connection with FIG. 4, the BLE radio 12 is operative for transmitting an advertising beacon in an advertising packet 70 having a payload 62 as a series of beacon pulses, and the controller 32 is operative for automatically writing/loading the scanned code 14 into the payload 62.

Figure 4:
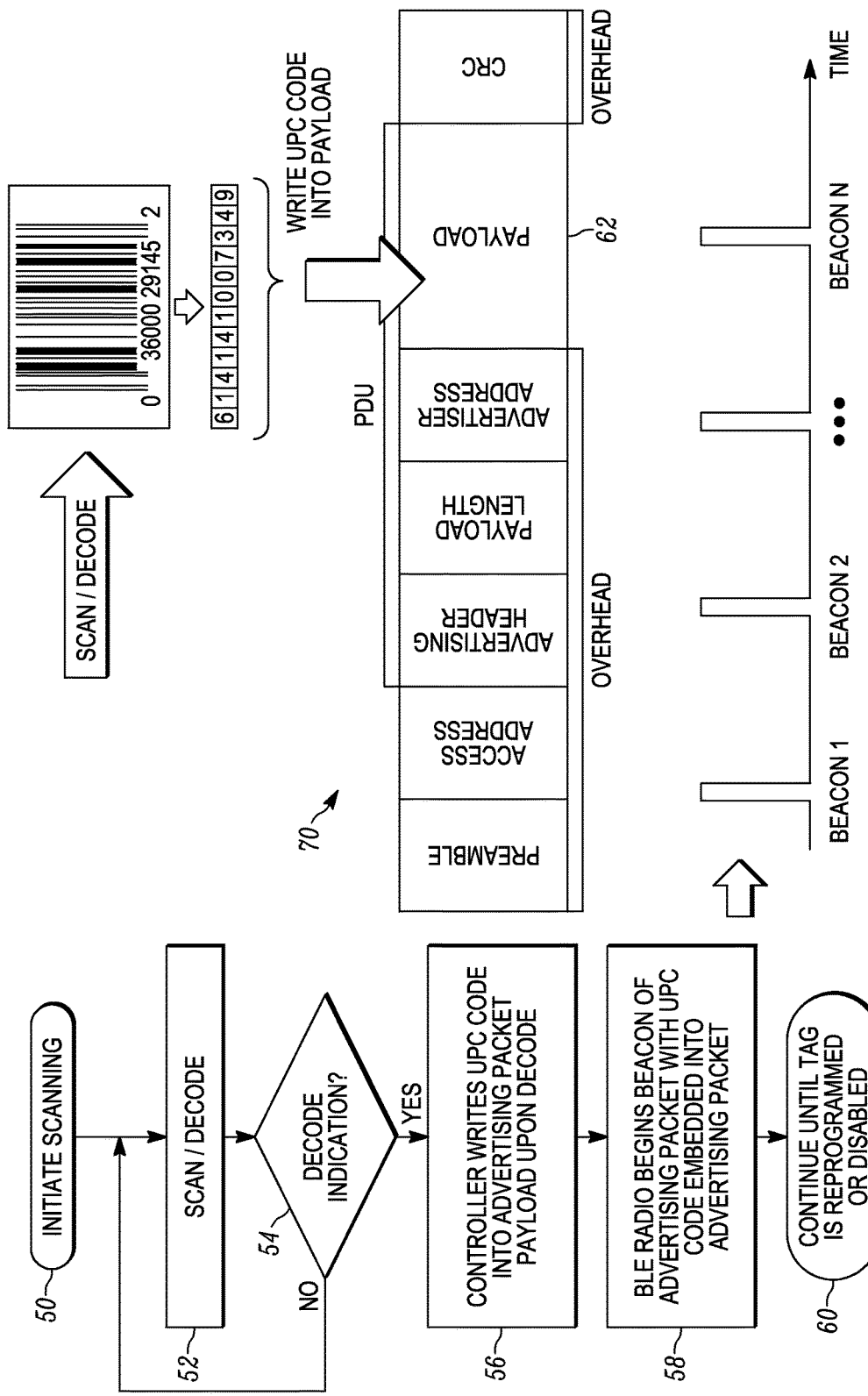
FIG. 4 is a flow chart together with explanatory depictions of a method of scanning and writing/loading an asset-identifying code into a beacon transmission in accordance with the present disclosure.

Turning to the flow chart depicted in FIG. 4, scanning is initiated in step 50 by either manually pushing the pushbutton 36, or by the NFC circuit 40 automatically entering its secure enable mode. In step 52, the scanner scans the code 14, and the controller 32 attempts to decode the code 14. The code 14 is typically already on, or associated with, the asset 16. For example, the code 14 could be printed on a paper label attached to the asset 16. The scanning could be performed either before, or after, the device 18 is attached to the asset 16. If the decode indicator 34 does not indicate that a successful decoding has occurred in step 54, then the scan step 52 is repeated. Otherwise, the controller 32 automatically writes/loads the scanned code 14 into the payload 62 in step 56.

The BLE advertising packet 70 depicted in FIG. 4 is defined in the Link Layer, can be 80 to 376 bits in length, and has an initial overhead component, which includes a preamble, an access address, an advertising header, a payload length, and an advertiser address; a protocol data unit (PDU) component or the payload 62; and a final overhead or cyclic redundancy check (CRC) component to detect errors in the payload 62 in which the scanned code was written in step 56.

In step 58, the BLE radio 12 begins periodically transmitting a series of beacon pulses, at least one of the pulses having the embedded code 14 written in the payload 62. Preferably, each pulse has the embedded code 14. The transmission rate or frequency of the beacon pulses can be increased if an accelerometer 64 (see FIG. 3) determines that a tagged asset is moving. The beacon transmission continues in step 60 until the tag 10 has been re-programmed or disabled.

Thus, as described herein, BLE technology, rather than RFID technology, has been used to tag assets, thereby improving the operating performance and range (e.g., ten to thirty meters) at which tags can be read, increasing the working lifetime (e.g., to multiple years) of the tags, making the tags more robust in terms of more accurately and reliably tracking and locating tagged assets, decreasing the cost and size of the tags, and making the tags re-usable. The assets can now be tagged at any location, thereby making the tags easier to program, deploy, disable and de-commission.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A Bluetooth low energy (BLE)-based asset tag for transmitting a code that identifies an asset, comprising:
 a device attachable to the asset;
 a scanner supported by and within the device, and configured to scan the code, wherein the scanner is an electro-optical reader configured to read the code electro-optically;

a controller supported by and within the device, and configured to load the electro-optically scanned code automatically into a payload; and a BLE radio supported by the device and configured to transmit an advertising beacon in an advertising packet having the payload with the electro-optically scanned code embedded therein.

2. The asset tag of claim 1, wherein the scanner includes a light source configured to direct a light beam to the code and return therefrom, and a light detector configured to detect return light from the code; and wherein the controller processes the detected return light into an electrical signal, decodes the electrical signal into decoded data indicative of the scanned code, and writes the decoded data into the payload.

3. The asset tag of claim 1, wherein the device has a light-transmissive window through which the light beam and the return light pass.

4. The asset tag of claim 3, wherein the window is in contact with the code during scanning.

5. The asset tag of claim 1, and an initiator configured to initiate the scanning.

6. The asset tag of claim 5, wherein the initiator is a manually operated control on the device.

7. The asset tag of claim 5, wherein the initiator is an automatically operated near field communication (NFC) control on the device.

8. The asset tag of claim 1, and an indicator for indicating that the scanning was successful.

9. The asset tag of claim 1, wherein the BLE radio transmits the advertising packet with the scanned code in the payload as a series of beacon pulses.

10. A method of transmitting a code that identifies an asset, comprising:

attaching a device to the asset;

scanning the code with a scanner supported by and within the device, wherein the scanning is performed by electro-optically reading the code;

automatically loading the electro-optically scanned code into a payload in an advertising packet; and transmitting an advertising beacon in the advertising packet the payload with the electro-optically scanned code embedded therein using a Bluetooth low energy (BLE)-based radio supported by and within the device.

11. The method of claim 10, wherein the scanning is performed by directing a light beam to the code for return therefrom, and detecting return light from the code; and wherein the loading is performed by processing the detected return light into an electrical signal, decoding the electrical signal into decoded data indicative of the scanned code, and writing the decoded data into the payload.

12. The method of claim 10, and passing the light beam and the return light device through a light-transmissive window on the device.

13. The method of claim 12, and contacting the window with the code during scanning.

14. The method of claim 10, and initiating the scanning.

15. The method of claim 14, wherein the initiating is performed by manually operating a control on the device.

16. The method of claim 14, wherein the initiating is performed by automatically operating a near field communication (NFC) control on the device.

17. The method of claim 10, and indicating that the scanning was successful.

18. The method of claim 10, wherein the transmitting is performed by transmitting the advertising packet with the scanned code in the payload as a series of beacon pulses.

* * * * *